United States Patent Office 3,489,767
Patented Jan. 13, 1970

---

3,489,767
1-(PHENYLSULFONYL)-3-INDOLYL ALIPHATIC ACID DERIVATIVES
Hisao Yamamoto, Nishinomiya-shi, and Masaru Nakao, Osaka, Japan, assignors to Sumitomo Chemical Company, Ltd., Osaka, Japan, a corporation of Japan
No Drawing. Filed Mar. 15, 1967, Ser. No. 623,206
Claims priority, application Japan, Mar. 18, 1966, 41/17,086; Apr. 1, 1966, 41/20,622, 41/20,623; May 2, 1966, 41/28,125
Int. Cl. C07d 27/56
U.S. Cl. 260—326.12      4 Claims

ABSTRACT OF THE DISCLOSURE

Novel 1-(phenylsulfonyl)-3-indolyl aliphatic acid derivatives are prepared by reacting a hydrazine derivative with a ketone derivative. The novel compounds have prominent antiphlogistic, analgesic and antipyretic actions.

---

This invention relates to a process for preparing 1-(phenylsulfonyl)-3-indolyl aliphatic acid derivatives represented by the formula,

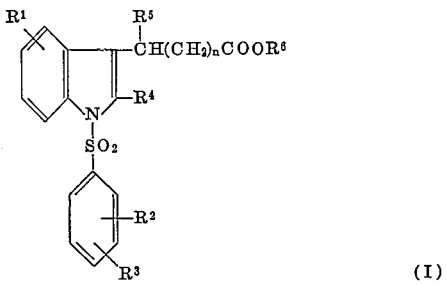

wherein $R^1$ is a hydrogen atom, halogen atom, alkoxy, alkylthio or alkyl group having up to 3 carbon atoms; $R^2$ and $R^3$ are hydrogen atoms, halogen atoms, hydroxy groups or carboxy groups or alkoxy, alkylthio, alkyl or alkoxycarbonyl groups having up to 3 carbon atoms; $R^4$, $R^5$ and $R^6$ are hydrogen atoms or alkyl groups having up to 3 carbon atoms; and $n$ is 0, 1 or 2.

All the 1-(phenylsulfonyl)-3-indolyl aliphatic acid derivatives obtained in accordance with the present invention are novel compounds. They have prominent antiphlogistic, analgesic and antipyrectic actions and are quite useful compounds.

The present invention aims at easily preparing these useful compounds.

That is, the 1-(phenylsulfonyl)-3-indolyl-aliphatic acid derivatives are obtained in extremely high yields by reacting at elevated temperatures in the presence or absence of solvent and of condensing agent hydrazine derivatives, or salts thereof, represented by the formula,

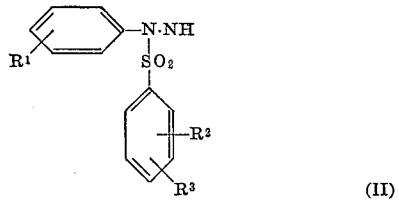

wherein $R^1$, $R^2$ and $R^3$ are the same as in the case of Formula I, with ketone derivatives represented by the formula,

wherein $R^4$, $R^5$, $R^6$ and $n$ are the same as in the case of general Formula I.

For reference, one example of the reaction will be shown below by way of chemical reaction equation.

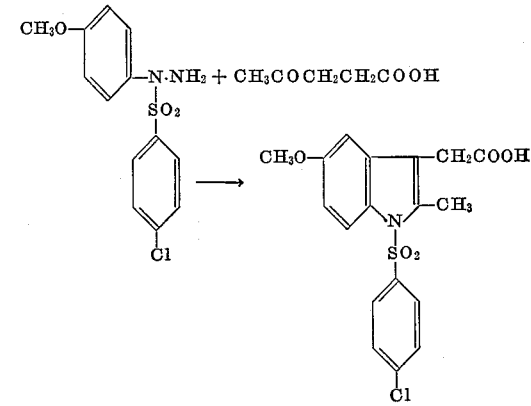

The present reaction progresses even in the absence of solvent, but the use of suitable solvents is preferable in most cases. As the solvents, there are used, for example, organic acids such as acetic acid, non-polar solvents such as cyclohexane, or dimethylformamide. As the condensing agents, there are used inorganic acids such as hydrochloric acid, metal halides, boron fluorides or polyphosphoric acids, though these are not always required as well. Generally, the reaction proceeds at a temperature within the range of 50°–200° C., but a preferable temperature range is 65°–95° C., and the reaction terminates in a short period of time, in general. After completion of the reaction, the desired product is directly obtained in the form of a precipitate, in general. In case no crystals are deposited, the solvent is concentrated or a liquid such as acetic acid-water, water or petroleum ether is added to the reaction mixture, whereby crystals can be obtained.

The ring formation of ketones with the asymmetric $N^1$-(phenylsulfonyl)-$N^1$-phenylhydrazine derivatives in accordance with the present invention have been entirely unknown heretofore. Moreover, the starting hydrazine derivatives also are novel compounds which have not been disclosed in the literature.

According to the present process, there are obtained compounds having the following substituents:

$R^1$: Hydrogen, chloro, bromo, methoxy, ethoxy, methylthio, ethylthio, methyl, ethyl and n-propyl.

$R^2$ and $R^3$: Hydrogen, chloro, bromo, hydroxy, methoxy, ethoxy, methylthio, ethylthio, methyl, ethyl, carboxy, methoxycarbonyl and ethoxycarbonyl.

$R^4$, $R^5$ and $R^6$: Hydrogen, methyl and ethyl.

Concretely, the compounds enumerated below can be readily prepared.

1-(p-chlorophenylsulfonyl)-2-methyl-5-methoxy-3-indolylacetic acid.
1-(p-chlorophenylsulfonyl)-2-methyl-5-methylthio-3-indolylacetic acid.
1-(p-chlorophenylsulfonyl)-2-methyl-5-chloro-3-indolylacetic acid.
1-(p-chlorophenylsulfonyl)-2,5-dimethyl-3-indolylacetic acid.
γ{1-(phenylsulfonyl)-5-methoxy-3-indolyl}butyric acid.
Methyl α-[1-(chlorophenylsulfonyl)-2-methyl-5-methoxy-3-indolyl]propionate.
1-(p-tolylsulfonyl)-2-methyl-5-methoxy-3-indolylacetic acid.
1-(p-tolylsulfonyl)-2-methyl-5-chloro-3-indolylacetic acid.
1-(4'-hydroxy-3'-carboxy-phenylsulfonyl)-2-methyl-5-methoxy-3-indolylacetic acid.

γ-[1-(4′-methoxycarbonyl-phenylsulfonyl)-2-methyl-5-methoxy-3-indolyl]-butyric acid.

All the hydrazine derivatives represented by the general Formula II, which are intermediates employed in the present process, are novel compounds. These compounds are prepared in the following manner:

A phenylhydrazone derivative represented by the general formula,

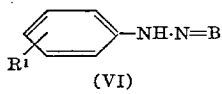

(VI)

wherein $R^1$ is the same as in the case of general Formula I; and B is a ketone or aldehyde residue, is reacted with a phenylsulfonyl halide represented by the formula,

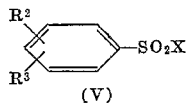

(V)

wherein $R^2$ and $R^3$ are the same as in the case of general Formula I; and X is a halogen atom, to form an $N^1$-phenylsulfonyl-$N^1$-phenylhydrazone derivative represented by the formula,

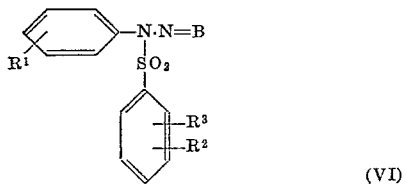

(VI)

wherein $R^1$, $R^2$, $R^3$ and B are as mentioned above.

The phenylhydrazone derivative represented by the general Formula IV is charged in a basic solvent such as pyridine or in an inert organic solvent containing a basic reagent and then the phenylsulfonyl halide is added thereto, and the resulting liquid is allowed to stand at room temperature or, in some cases, is heated or cooled, whereby the reaction proceeds substantially quantitatively. In case the desired product is not obtained in the form of a precipitate, the solvent is concentrated or, in some cases, water or petroleum ether is added, whereby crystals can be produced.

According to the present process, there are prepared such $N^1$-phenylsulfonyl-$N^1$-phenylhydrazone derivatives as shown below.

Acetaldehyde $N^1$-(p-chlorophenylsulfonyl)-$N^1$-(p-methoxyphenyl)-hydrazone.
Acetaldehyde $N^1$-(p-chlorophenylsulfonyl)-$N^1$-(p-methylphenyl)-hydrazone.
Acetaldehyde $N^1$-(p-chlorophenylsulfonyl)-$N^1$-(p-methylthiophenyl)-hydrazone.
Acetaldehyde $N^1$-(p-chlorophenylsulfonyl)-$N^1$-phenylhydrazone.
Benzaldehyde $N^1$-(p-tolylsulfonyl)-$N^1$-(p-methoxyphenyl)-hydrazone.
Chloral $N^1$-(p-chlorophenylsulfonyl)-$N^1$-(p-methoxyphenyl)-hydrazone.
Methyl levulinate $N^1$-(p-chlorophenylsulfonyl)-$N^1$-(p-methoxyphenyl)-hydrazone.
Acetaldehyde $N^1$-(p-tolylsulfonyl)-$N^1$-(p-methoxyphenyl)-hydrazone.
Acetaldehyde $N^1$-(p-tolylsulfonyl)-p-tolylhydrazone.
Acetaldehyde $N^1$-(4′-hydroxy-3′-carboxy-phenylsulfonyl)-$N^1$-(p-methoxyphenyl)-hydrazone.
Acetaldehyde $N^1$-(4′-methoxycarbonyl-phenylsulfonyl)-$N^1$-(p-methoxyphenyl)-hydrazone.

As the hydrazones to be used as starting materials in the present process, any ketones or aldehydes may be used, in principle. In view of the formation of by-products, however, those which cannot take part in the Fischer indole formation are preferable. As ketones, there are used benzophenone, methyl levulinate and the like, and as aldehydes, acetaldehyde, chloral, benzaldehyde and the like. Of these, acetaldehyde is most commercially preferable in view of cost.

Further, the $N^1$-phenylsulfonyl-$N^1$-phenylhydrazone derivative represented by the formula,

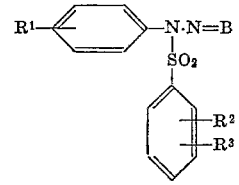

(VI)

wherein $R^1$, $R^2$, $R^3$ and B are as mentioned before, is reacted with an acid in a suitable solvent, whereby a $N^1$-phenylsulfonyl-$N^1$-phenylhydrazine derivative represented by the Formula II is obtained.

As solvents for the hydrazone derivatives, alcohols such as methanol and ethanol, and ethers are most suitable. In addition thereto, non-polar solvents such as toluene and benzene may also be used. In this case, the solvents should contain a suitable amount of water or alcohol.

As acids taking part in the hydrazone decomposition, organic acids are not unusable, but in view of the yields and purity of the products, inorganic acids are preferable and, of these, hydrochloric and sulfuric acids shows the most excellent results.

The hydrazone decomposition can be simply effected at 0°–25° C., but may also be carried out at temperatures out of said range, e.g. at below 0° C. However, in case the reaction temperature is excessively high, by-products are liable to be formed.

After-treatments are simple, in general, and hydrazine derivatives produced by decomposition are obtained as crystalline salts in alcohol, ether or non-polar solvents. In case no crystals are formed, the solvents are concentrated, whereby crystals are deposited. Further, when the solvents are neutralized with an alkali, free hydrazine derivatives can be obtained.

The hydrazine derivatives readily obtainable in accordance with the present process are as follows:

$N^1$-(p-chlorophenylsulfonyl)-$N^1$-(p-methoxyphenyl)-hydrazine.
$N^1$-(p-chlorophenylsulfonyl)-$N^1$-(p-tolyl)-hydrazine.
$N^1$-(p-chlorophenylsulfonyl)-$N^1$-(p-methylthiophenyl)-hydrazine.
$N^1$-(p-chlorophenylsulfonyl)-$N^1$-phenyl-hydrazine.
$N^1$-(p-chlorophenylsulfonyl)-$N^1$-(p-methoxyphenyl)-hydrazine hydrochloride.
$N^1$-(p-chlorophenylsulfonyl)-$N^1$-(p-methoxyphenyl)-hydrazine sulfate.
$N^1$-(phenylsulfonyl)-$N^1$-(p-methoxyphenyl)-hydrazine hydrochloride.
$N^1$-(p-tolylsulfonyl)-$N^1$-(p-methoxyphenyl)-hydrazine hydrochloride.
$N^1$-(p-tolylsulfonyl)-$N^1$-p-tolyl-hydrazine hydrochloride.
$N^1$-(4′-hydroxy-3′-carboxyphenylsulfonyl)-$N^1$-(p-methoxyphenyl)-hydrazine hydrochloride.
$N^1$-(4′-methoxycarbonyl-phenylsulfonyl)-$N^1$-(p-methoxyphenyl)-hydrazine hydrochloride.

Further, the compounds represented by the general Formula V are reacted directly with hydrazine derivatives represented by the formula,

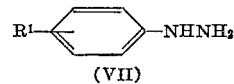

(VII)

wherein $R^1$ is as mentioned before, whereby there are by-produced, in addition to the asymmetric hydrazine derivatives represented by the Formula II, symmetric hydrazine derivatives represented by the formula,

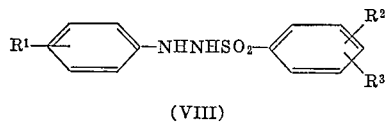

(VIII)

wherein $R^1$, $R^2$ and $R^3$ are as mentioned before.

The symmetric hydrazine derivatives of the general Formula VIII do not react with the ketone derivatives represented by the general Formula III, and hence can be reacted as such, i.e. without separating and insolating the asymmetric hydrazine derivatives of the Formula II, with the ketone derivatives of the Formula III, as shown, for example, in the following equation:

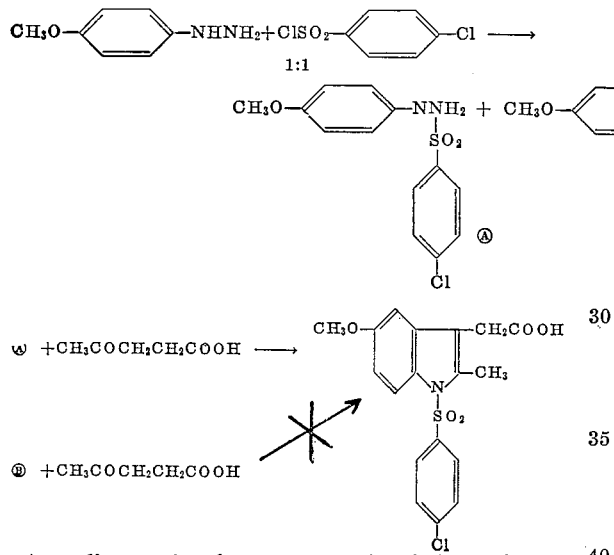

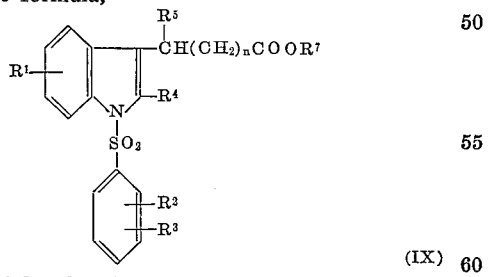

According to the above process also, it is possible to obtain 1 - (p - chlorophenylsulfonyl) - 2 - methyl - 5 - methoxy-3-indolylacetic acid and the like.

Alternatively, the indole derivatives represented by the general Formula I can be prepared according to the process shown below. That is, the novel 3-indolyl aliphatic acid derivatives represented by the Formula I, wherein $R^6$ is a hydrogen atom, can be advantageously obtained on commercial scale by decomposing compounds represented by the formula,

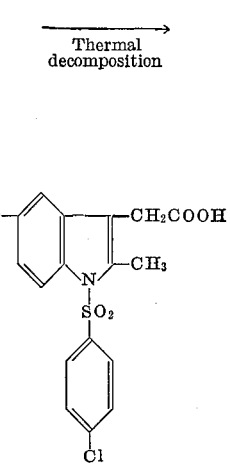

(IX)

wherein $R^1$, $R^2$, $R^3$, $R^4$ and $R^5$ are as mentioned before; and $R^7$ is a t-butyl, benzyl or tetrahydropyranyl group.

For example, a benzyl ester of 3-indolyl aliphatic acid derivative is hydrogenated in the presence of a suitable metal catalyst, e.g. palladium, whereby the ester is decomposed to give the free 3-indolyl aliphatic acid derivative.

In the case of a tertiary butyl ester, the ester is treated in the presence of an arylsulfonic acid, e.g. p-toluenesulfonic acid, whereby the ester is decomposed to give the desired product. There are some cases where the tertiary butyl ester is merely heated and melted, whereby the ester is decomposed to give he desired product.

The above process is, for example, as follows:

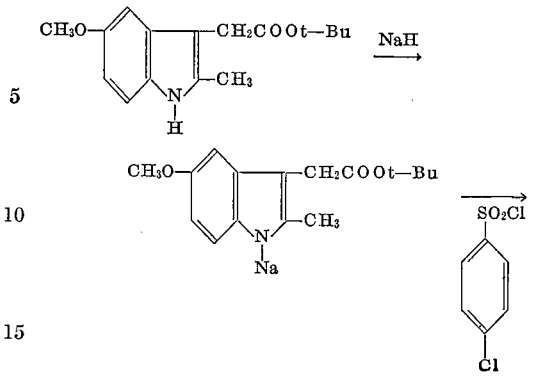

Based on this process, the following compounds are synthesized:

1-(p-chlorophenylsulfonyl)-2-methyl-5-methoxy-3-indolylacetic acid.
1-(p-chlorophenylsulfonyl)-2-methyl-5-methylthio-3-indolylacetic acid.
1-(p-chlorophenylsulfonyl)-2-methyl-5-chloro-3-indolylacetic acid.
γ{1-(phenylsulfonyl)-5-methoxy-3-indolyl}butyric acid.
Methyl α-[1-(chlorophenylsulfonyl)-2-methyl-5-methoxy-3-indolyl] propionate.
1-(p-tolylsulfonyl)-2-methyl-5-methoxy-3-indolylacetic acid.
1-(p-tolylsulfonyl)-2-methyl-5-chloro-3-indolylacetic acid.

As already mentioned, these compounds are high in biological activity and show excellent antiphlogistic action against, for example, caragenin edema.

The following examples illustrate the present invention:

Example 1

16.4 g. of acetaldehyde p-methoxyphenyl-hydrazone and 11 g. of pyridine were dissolved in 100 ml. of anhydrous tetrahydrofuran. To the solution, a solution of 27 g. of p-chlorobenzenesulfonyl chloride in 120 ml. of tetrahydrofuran was added dropwise with ice-cooling. Thereafter, the reaction mixture was stirred for 2 hours with ice-cooling, and was then allowed to stand overnight at room temperature. A produced precipitate was filtered off, and the filtrate was concentrated under reduced pressure to substantial dryness. The thus obtained substance was washed with 20 ml. of methanol, was recovered by filtration and was dried in reduced pressure to give 15 g. of crystals of acetaldehyde $N^1$ - (p-chlorophenylsulfonyl)-$N^1$-(p-methoxyphenyl) - hydrazone, M.P. 119°–121° C.

Benzaldehyde p-methoxyphenylhydrazone was treated in substantially the same manner as above to obtain benzaldehyde $N^1$ - (p - chlorophenylsulfonyl) - $N^1$-(p-methoxyphenyl) - hydrazone. This product showed the identical infrared absorption spectra with that of authentic sample.

Example 2

75.5 g. of p-chlorophenylsulfonyl chloride was dissolved in 400 ml. of anhydrous ether. To the solution were added dropwise with ice-cooling 40 g. of acetaldehyde p-tolylhydrazone and then 28 g. of pyridine. In this case, the reaction mixture was kept at below 5° C. After completion of the dropwise addition, the mixture was stirred at room temperature for 2 hours and was then allowed to stand overnight. Produced crystals were filtered, washed with 200 ml. of cold water and were then dried on calcium chloride in a reduced pressure desiccator to give 55 g. of acetaldehyde $N^1$-(p-chlorophenylsulfonyl)-$N^1$-(p-tolyl)-hydrazone, M.P. 114°–116° C. (decomposition). When the reaction mother liquor was concentrated under reduced pressure, 14 g. of acetaldehyde $N^1$ - (p - chlorophenylsulfonyl) - $N^1$ - (p - tolyl)-hydrazone was additionally obtained. According to thin layer chromatography and infrared absorption spectrum, it was confirmed that this product was identical with the previously obtained product.

Example 3

50 g. of acetaldehyde p-methoxyphenyl-hydrazone was dissolved in 500 ml. of dry ether. To the solution, 64.7 g. of phenylsulfonyl chloride was added with ice-cooling. Subsequently, 28.9 g. of dry pyridine was dropwise added while maintaining the temperature at below 5° C. After completion of the dropwise addition, the reaction mixture was stirred at said temperature for about 4 hours. Produced crystals were filtered, were thoroughly washed with water, were washed with a small amount of ether and were then dried to give 86 g. of white crystals of acetaldehyde $N^1$ - (phenylsulfonyl) - $N^1$ - (p - methoxyphenyl)-hydrazone, M.P. 108.5°–109.5° C.

Example 4

50 g. of acetaldehyde p-methoxyphenyl-hydrazone was dissolved in 500 ml. of dry ether. To the solution, 70 g. of p-tolylsulfonyl chloride was gradually added with ice-cooling. Subsequently, 28.9 g. of dry pyridine was added dropwise while maintaining the temperature at below 5° C. After completion of the dropwise addition, the reaction mixture was stirred at said temperature for about 4 hours. Produced crystals were filtered, were thoroughly washed with water, were washed with a small amount of ether and were then dried to obtain 47 g. of pale yellow crystals of acetaldehyde $N^1$-(p-tolylsulfonyl)-$N^1$-(p-methoxyphenyl)-hydrazone, M.P. 99°–100.5° C.

Example 5

67 g. of acetaldehyde phenylhydrazone was dissolved in 600 ml. of dry ether. To the solution, 106 g. of phenyl-sulfonyl chloride was gradually added with ice-cooling. Subsequently, 47.4 g. of dry pyridine was added dropwise while maintaining the temperature at below 5° C. After completion of the dropwise addition, the reaction mixture was stirred at said temperature for about 4 hours. Produced crystals were filtered, were thoroughly washed with water, were washed with a small amount of ether and were then dried to obtain 61 g. of light orange white crystals of acetaldehyde $N^1$-(phenylsulfonyl)-$N^1$-(phenyl)-hydrazone, M.P. 97°–99° C.

Example 6

24 g. of acetaldehyde p-methoxyphenyl-hydrazone was dissolved in 240 ml. of dry ether. To the solution, 41 g. of 4-hydroxy-3-carboxyphenylsulfonyl chloride was gradually added with ice-cooling. Subsequently, 13.7 g. of dry pyridine was gradually added dropwise at below 5° C. After completion of the dropwise addition, the reaction mixture was stirred at said temperature for about 4 hours. Produced crystals were recovered by filtration, were thoroughly washed with water, were washed wtih a small amount of ether and were then dried to obtain 22 g. of white crystals of acetaldehyde $N^1$-(4-hydroxy-3-carboxyphenylsulfonyl)-$N^1$-(p-methoxyphenyl)-hydrazone, M.P. 70°–73° C.

Example 7

106 g. of benzenesulfonyl chloride was added to a solution of 67 g. of acetaldehyde phenylhydrazone in 600 ml. of dry ether, and then 47.4 g. of dry pyridine was dropwise added to the mixture at below 5° C. Stirring was continued for additional 6 hours. After cooling overnight, the produced crystals was filtered, washed with water several times and a small quantity of ether, and then was dried to give 61 g. of white crystals of acetaldehyde $N^1$-(phenylsulfonyl)-phenylhydrazone having melting point of 97°–99° C.

Example 8

10 g. of acetaldehyde $N^1$-(p-chlorophenylsulfonyl)-$N^1$-(p-methoxyphenyl)-hydrazone was suspended in 80 ml. of methanol. Into the suspension, dry hydrogen chloride gas was absorbed, with ice-cooling, to substantial saturation. Insolubles were filtered off, and the filtrate was concentrated to about ½ at below 20° C. under reduced pressure. The mixture was allowed to stand in a refrigerator for 2 days, whereby large quantities of crystals were deposited. The crystals were filtered, were washed with ether and were then dried to give 5.0 g. of crystals of crude $N^1$-(p-chlorophenylsulfonyl)-$N^1$-(p-methoxyphenyl) - hydrazine hydrochloride, M.P. 92°–93° C. (decomposition). These crystals were treated with an aqueous sodium carbonate solution, whereby free $N^1$-(p-chlorophenylsulfonyl)-$N^1$-(p-methoxyphenyl) - hydrazine, M.P. 124°–126° C., was obtained.

Further, it was confirmed, according to infrared absorption spectrum and thin layer chromatography, that $N^1$-(p-chlorophenylsulfonyl)-$N^1$-(p-methoxyphenyl) - hydrazine hydrochloride was obtained in the same manner as above also from benzaldehyde $N^1$-(p-chlorophenylsulfonyl)-$N^1$-(p-methoxyphenyl)-hydrazone.

Example 9

9 g. of acetaldehyde $N^1$-(p-chlorophenylsulfonyl)-$N^1$-(p-tolyl)-hydrazone was suspended in a solution mixture of 40 ml. of methanol and 200 ml. of ether. Gaseous hydrogen chloride was saturated in the solution with ice-cooling. After the mixture was left overnight in a cold place, produced crystals were filtered, were washed with 10 ml. of ether and were then dried to give $N^1$-(p-chlorophenylsulfonyl)-$N^1$-(p-tolyl) - hydrazine hydrochloride, M.P. 85°–86° C. (decomposition).

Example 10

23 g. of acetaldehyde $N^1$-(phenylsulfonyl)-$N^1$-phenyl-hydrazone was suspended in a solution mixture of 15 ml.

of ethanol and 200 ml. of ether, and gaseous hydrogen chloride was saturated to the solution at ice-salt temperatures and it was allowed to stand in a refrigerator overnight to give light brown prism crystals, which were filtered, washed with ether and dried to give 8 g. of $N^1$-(phenylsulfonyl) - $N^1$ - phenylhydrazine hydrochloride, which melting point was 90° C. (decomp.)

Example 11

10 g. of acetaldehyde $N^1$-(4-hydroxy-3-carboxyphenylsulfonyl)-$N^1$-(p-methoxyphenyl) - hydrazine was suspended in a solution mixture of 20 ml. of ethanol and 200 ml. of ether. Into the suspension, gaseous hydrogen chloride was absorbed, at salt-ice temperatures. The reaction mixture once become a homogeneous solution but again produced a precipitate by further introduction of gaseous hydrogen chloride. After saturation with hydrogen chloride the mixture was allowed to stand for a while in a cold room, and then the precipitate was filtered and was washed with ether to obtain about 5 g. of greyish brown $N^1$-(4-hydroxy-3-carboxyphenylsulfonyl)-$N^1$-(p-methoxyphenyl)-hydrazine hydrochloride, M.P. 146° C. (decomposition).

Example 12

10 g. of acetaldehyde $N^1$-(phenylsulfonyl)-$N^1$-(p-methoxyphenyl)-hydrazone was suspended in 40 ml. of ethanol. Into the suspension, gaseous hydrogen chloride was gradually absorbed at salt-ice temperatures. In about 30 minutes, the hydrazone was completely dissolved to form a homogeneous solution. Into the solution, gaseous hydrogen chloride was further added to saturation. Thereafter, about 1 l. of ether was added to the solution, and the mixture was allowed to stand in a cold room to deposit a greyish brown precipitate. The precipitate was filtered, was washed with ether and was then dried to obtain about 2.5 g. of $N^1$-(phenylsulfonyl)-$N^1$-(p-methoxyphenyl)-hydrazine hydrochloride, M.P. 82° C. (decomposition).

Example 13

20 g. of acetaldehyde $N^1$-(p-tolylsulfonyl)-$N^1$-(p-methoxyphenyl)-hydrazone was suspended in 80 ml. of ethanol. Into the suspension, gaseous hydrogen chloride was gradually absorbed, at ice-salt temperatures. After the hydrazone had been completely dissolved to form a homogeneous solution, gaseous hydrogen chloride was further added to saturation. Thereafter, ethanol was distilled off, and the residue was dissolved in benzene. To the solution, a large amount of petroleum ether was added to give a brown precipitate. The precipitate was filtered, was washed with petroleum ether and was then dried to give about 5 g. of a yellowish brown $N^1$-(p-tolylsulfonyl)-$N^1$-(p-methoxyphenyl) - hydrazine hydrochloride, M.P. 70° C. (decomposition).

Example 14

2.0 g. of $N^1$-(p-chlorophenylsulfonyl)-$N^1$-(p-methoxyphenyl)-hydrazine hydrochloride and 9.0 g. of levulinic acid were stirred at 70° C. for 2 hours. After cooling the reaction mixture, 50 ml. of water was added to the mixture to give crystals. The produced crystals were filtered and were then dried to give 2.3 g. of 1-(p-chlorophenylsulfonyl)-2-methyl-5-methoxy-3-indolylacetic acid, M.P. 152–158° C. The recrystallization 2 times from acetone, gave pure crystals of the melting point of 164°–165° C.

Elementary analysis:

|  | C | H | N | S | Cl |
|---|---|---|---|---|---|
| Calculated, percent | 54.89 | 4.09 | 3.55 | 8.14 | 9.00 |
| Found, percent | 55.03 | 4.09 | 3.29 | 8.15 | 8.93 |

Example 15

By the same method as in Example 14, 1-(p-chlorophenylsulfonyl)-2,5-dimethyl-3-indolylacetic acid was obtained. The recrystallization from acetone gave crystals having a melting point of 192°–194° C.

Elementary analysis:

|  | C | H | N | S | Cl |
|---|---|---|---|---|---|
| Calculated, percent | 57.21 | 4.27 | 3.71 | 8.49 | 9.12 |
| Found, percent | 57.38 | 4.12 | 3.68 | 8.30 | 8.96 |

Example 16

2.5 g. of $N^1$-(phenylsulfonyl)-$N^1$-(p-methoxyphenyl)-hydrazine hydrochloride and 5 g. of levulinic acid, was stirred at 70°–75° C. for about 2 hours. After completion of the reaction, the mixture was poured into cold water to separate a black brown oily substance, which solidified in a little while. The solidified substance was filtered and was recrystallized from methanol-water and then from methanol to obtain 1 g. of a white 1-phenylsulfonyl-2-methyl-5-methoxy-3-indolylacetic acid, M.P. 144.5°–145.5° C.

Elementary analysis, $C_{18}H_{17}O_5NS$:

|  | C | H | N | S |
|---|---|---|---|---|
| Calculated, percent | 60.13 | 4.77 | 3.90 | 8.93 |
| Found, percent | 59.60 | 4.78 | 3.72 | 9.03 |

Example 17

4 g. of $N^1$-(phenylsulfonyl)-$N^1$-phenylhydrazine hydrochloride was added to a mixture of 8 g. of levulinic acid and 10 ml. of acetic acid, and stirred at 65°–70° C. for 2 hours. After cooling, the reaction mixture was poured into cold water to give a dark brown oily substance. It was dissolved in a solution mixture of acetone and water and treated with active carbon, and then water was added to the mixture to give crystals. The recrystallization from solution mixture of acetone and water gave white 1-(phenylsulfonyl)-2-methyl-3-indolylacetic acid. Melting point was 210° C. (decomp.). $C_{17}H_{15}O_4NS$.

Microanalysis:

|  | C | H | N | S |
|---|---|---|---|---|
| Calculated, percent | 61.99 | 4.59 | 4.25 | 9.74 |
| Found, percent | 62.44 | 4.48 | 4.15 | 9.51 |

We claim:
1. A compound represented by the formula,

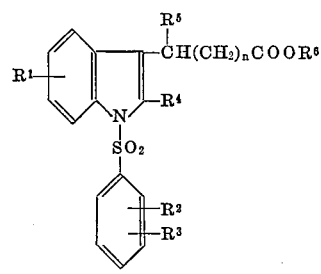

wherein $R^1$ is a hydrogen atom, chlorine or bromine atom, alkoxy of up to three carbon atoms, or alkyl of up to three carbon atoms; $R^2$ and $R^3$ are hydrogen atom, chlorine or bromine atom, hydroxy group, carboxy group, methoxy group, alkyl of up to three carbon atoms, or alkoxycarbonyl of up to three carbon atoms; $R^4$, $R^5$ and $R^6$ are hydrogen atom or alkyl of up to three carbon atoms; and $n$ is 0.

2. An indolyl aliphatic acid compound according to claim 1 wherein $R^1$ is chlorine, a methoxy group or a methylthio group; $R^2$ is chlorine or hydrogen; $R^3$ is hydrogen; $R^4$ is a methyl group; $R^5$ is hydrogen; $R^6$ is hydrogen; and $n$ is 0.

3. 1 - (p - chlorophenylsulphonyl) - 2 - methyl - 5 - methoxy-3-indolylacetic acid.

4. 1 - (p - chlorophenylsulphonyl) - 2,5 - dimethyl - 3-indolylacetic acid.

References Cited

UNITED STATES PATENTS 3,264,321   8/1966   Herbst _____ 260—326.12

ALEX MAZEL, Primary Examiner

J. A. NARCAVAGE, Assistant Examiner

U.S. Cl. X.R.

260—556, 999